United States Patent
Janta-Polczynski et al.

(10) Patent No.: US 11,280,968 B2
(45) Date of Patent: Mar. 22, 2022

(54) HIGH-BANDWIDTH EMBEDDED OPTICAL CONNECTOR WITH LATCHING MECHANISM

(71) Applicant: International Business Machines Corporation, Armonk, NY (US)

(72) Inventors: Barnim Alexander Janta-Polczynski, Shefford (CA); Elaine Cyr, Granby (CA); Richard D. Langlois, Granby (CA); Paul Francis Fortier, Richelieu (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 16/797,199

(22) Filed: Feb. 21, 2020

(65) Prior Publication Data

US 2021/0263236 A1 Aug. 26, 2021

(51) Int. Cl.
*G02B 6/36* (2006.01)
*G02B 6/38* (2006.01)
*G02B 6/43* (2006.01)

(52) U.S. Cl.
CPC ......... *G02B 6/3885* (2013.01); *G02B 6/3829* (2013.01); *G02B 6/3897* (2013.01); *G02B 6/43* (2013.01)

(58) Field of Classification Search
CPC .. G02B 6/3885; G02B 6/3897; G02B 6/3829; G02B 6/43; G02B 6/36
See application file for complete search history.

(56) References Cited

U.S. PATENT DOCUMENTS

| | | | |
|---|---|---|---|
| 6,521,989 B2 | 2/2003 | Zhou | |
| 6,660,548 B2 | 12/2003 | Naydenkov et al. | |
| 6,929,225 B1* | 8/2005 | Kent | B44D 3/123 |
| | | | 211/65 |
| 6,945,709 B2 | 9/2005 | Steijer et al. | |
| 7,345,316 B2 | 3/2008 | Sherrer et al. | |
| 7,364,684 B2 | 4/2008 | Brandenburg et al. | |
| 7,452,140 B2 | 11/2008 | Ito et al. | |
| 8,534,927 B1 | 9/2013 | Barwicz et al. | |
| 8,545,108 B1 | 10/2013 | Barwic et al. | |
| 8,783,911 B2 | 7/2014 | Wu | |
| 9,482,820 B1 | 11/2016 | Barwicz et al. | |
| 9,720,188 B2* | 8/2017 | Barwicz | G02B 6/428 |
| 10,295,749 B1 | 5/2019 | Janta-Polczynski et al. | |
| 2002/0191895 A1 | 12/2002 | Hatam-Tabrizi et al. | |
| 2005/0111781 A1 | 5/2005 | Jain et al. | |
| 2007/0258683 A1 | 11/2007 | Rolston et al. | |

(Continued)

FOREIGN PATENT DOCUMENTS

| | | |
|---|---|---|
| JP | 2012230319 A | 11/2012 |
| JP | 2015513125 A | 4/2015 |
| WO | 2014120588 A1 | 8/2014 |

*Primary Examiner* — Jennifer Doan
(74) *Attorney, Agent, or Firm* — Cantor Colburn LLP; Peter Wang

(57) ABSTRACT

A structural feature of an optical connector assembly in which an optical chip is connectable with a fixed ferrule via a waveguide and is joined onto a section of a substrate. The structural feature includes a structural section disposed on one of the optical chip and the substrate and a ferrule support section that extends from the structural section and comprises a surface for adhesion to the fixed ferrule.

18 Claims, 4 Drawing Sheets

(56) References Cited

U.S. PATENT DOCUMENTS

| | | |
|---|---|---|
| 2009/0245736 A1 | 10/2009 | Ahadian et al. |
| 2013/0114924 A1 | 5/2013 | Loh et al. |
| 2013/0215613 A1 | 8/2013 | Wu |
| 2014/0270652 A1 | 9/2014 | Barwicz et al. |
| 2014/0270784 A1 | 9/2014 | Thacker et al. |
| 2016/0252687 A1 | 9/2016 | Badihi et al. |
| 2017/0196097 A1 | 7/2017 | Barwicz et al. |
| 2018/0356601 A1 | 12/2018 | Gniadek |

\* cited by examiner

HIGH-BANDWIDTH EMBEDDED OPTICAL CONNECTOR WITH LATCHING MECHANISM

BACKGROUND

The present invention generally relates to optical connectors, and more specifically, to a high-bandwidth optical connector with a latching mechanism.

Optical signals can be transmitted via optical fibers. It is often desirable to connect these optical fibers to devices. The devices can be provided as, for example, wave guides or signal processing features that can be arranged on a wafer such as, for example, a semiconductor wafer a or photonic integrated circuit chip (PIC).

SUMMARY

Embodiments of the present invention are directed to a structural feature of an optical connector assembly in which an optical chip is connectable with a fixed ferrule via a waveguide and is joined onto a section of a substrate. The structural feature includes a structural section disposed on one of the optical chip and the substrate and a ferrule support section that extends from the structural section and comprises a surface for adhesion to the fixed ferrule.

Embodiments of the present invention are directed to an optical connector assembly. The optical connector assembly includes a substrate, an optical chip connectable with a fixed ferrule via a waveguide and disposed on the substrate, a structural feature and a clip. The structural feature includes a structural section disposed over the optical chip and the substrate and a ferrule support section extendable from the lid section and comprising a surface for adhesion to the fixed ferrule. The clip is attachable to the ferrule support section and configured to mate with and secure a cable ferrule with the fixed ferrule for light coupling between the cable ferrule and the fixed ferrule.

Embodiments of the present invention are directed to a clip for securing a cable ferrule to a fixed ferrule for light coupling with the fixed ferrule adhered to a ferrule support section. The clip includes a spine, a hook element integrally coupled with a forward end of the spine to hook onto an underside of the ferrule support section and an elastic element integrally coupled with an aft end of the spine to elastically bias the cable ferrule toward the fixed ferrule.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
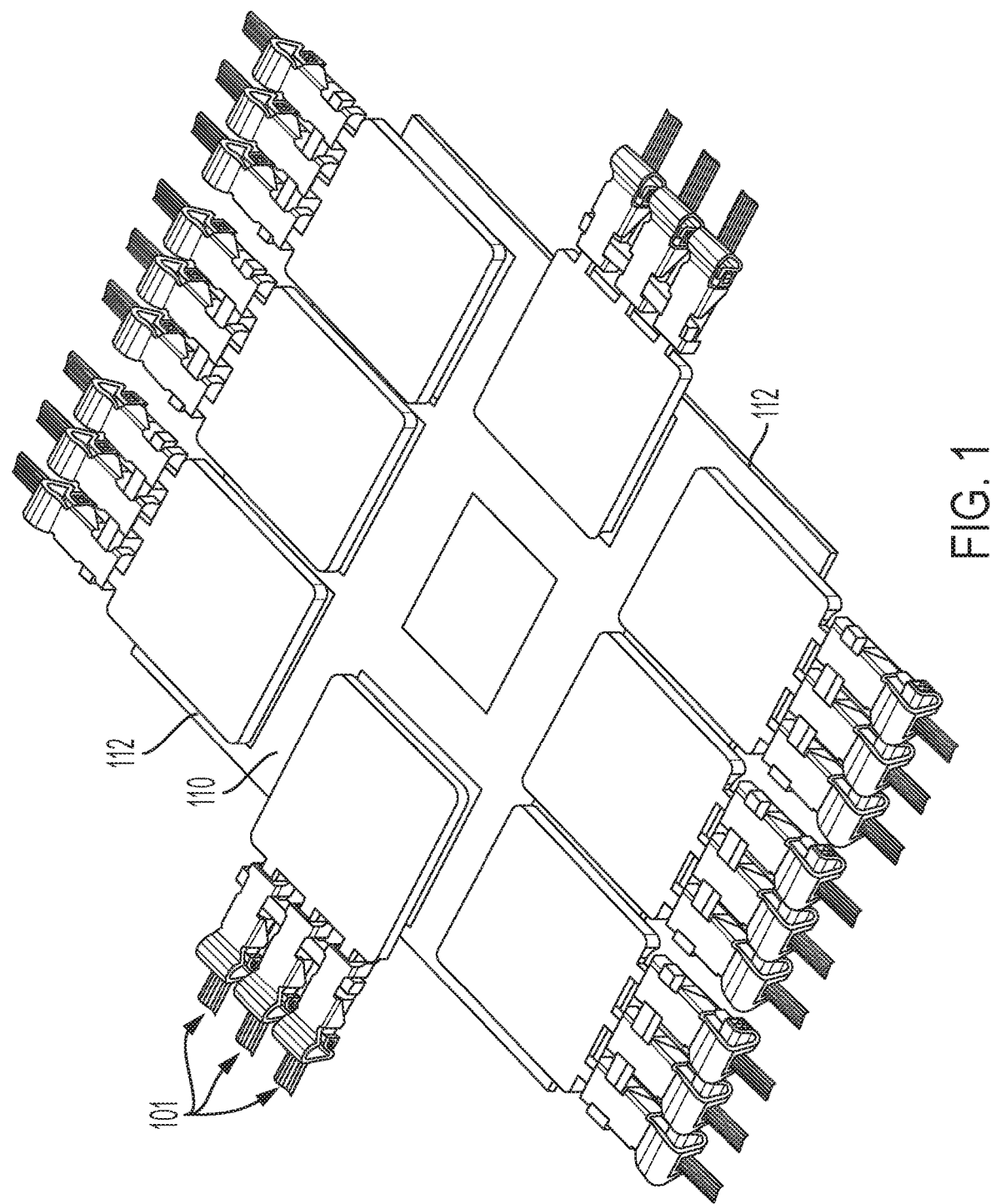
FIG. 1 is a perspective view of a printed circuit board (PCB) with multiple connector assemblies in accordance with embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Optical modules enable the movement of optical signals input/output (I/O) connections from a system for information treatment. Ferrules used in optical modules include optical fibers and alignment mechanisms such as guide pins to align the optical fibers for light coupling from a system optical fiber ferrule to the optical fibers of a module fixed ferrule. Optical fibers are secured into the ferrules with an optical connector grade adhesive.

Optical modules use optical connections to a photonic component, such as a photonic chip, to form a device as an assembly of microelectronic, optoelectronic, photonic chip and other optical components. In such cases, an optical connection to a system typically provides for securing and preventing separation of a connection between two or more mating ferrule halves, as well as providing strain relief and resistance to misalignment.

The use of optical modules to form optical connections has certain challenges. A first is that a density of the number of ferrules that can be integrated on a module side or periphery is often limited to support the optical bandwidth required. Large amounts of optical ports might require multiple ferrules and densely packed latching mechanisms that are incompatible with density limitations. In many cases, conventional latching mechanisms and ferrule sizes limit the density of the module. A second problem is related to ferrule sizing compared to a module that can create interferences with the supporting corresponding PCB. Making accommodations for such interferences can be costly and access to connector faces can thus be restricted whereby inspection and cleaning are made more difficult. A third problem involves the large coefficient of thermal expansion (CTE) mismatches between optical fibers and the rest of the modules that create stress that can overwhelm the strain relief capability of photonic chip coupling interfaces. As such, current implementations typically have a limited temperature window and high-temperature profile supports are required to enable solder reflowable photonic attachments of certain subassemblies scheme.

Embodiments of the present invention thus provide for an embedded optical connector assembly in which a photonic or optical chip is connectable with a fixed ferrule via optical fibers or a waveguide and is mounted onto a substrate where the optical connector assembly includes a supporting structure, such as a lid, and a latching clip for mating a cable ferrule to the fixed ferrule. The supporting structure includes a support section that is disposed close to or over the optical chip or a corresponding section of the substrate and a ferrule support section that extends from the support section for adhesion to the fixed ferrule. The ferrule support section can be angled relative to the section of the substrate and included a surface for adhesion to the fixed ferrule. The latching clip is attachable to the ferrule support section and is configured to secure a cable ferrule to the fixed ferrule for light coupling between the cable ferrule and the fixed ferrule for optical I/O purposes.

One or more embodiments of the present invention address one or more of the above-described shortcomings of the prior art by providing for an embedded optical connector assembly that allows for high-density configurations of large numbers of ferrules and optical I/O ports, for ferrule placement that does not exhibit substrate interference or access restrictions and for accommodating CTE mismatches.

Figure 2:
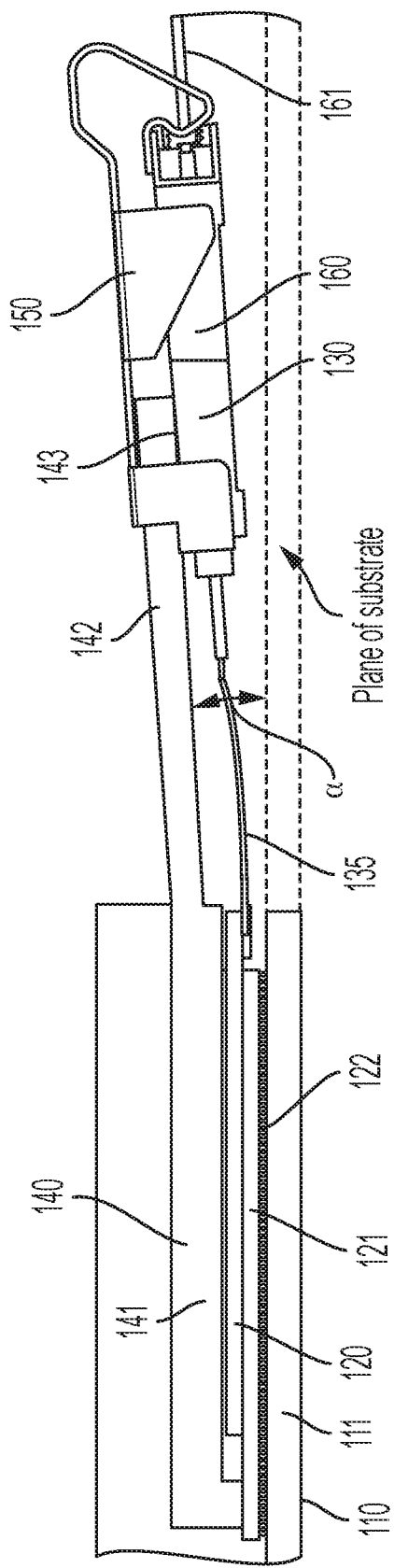
FIG. 2 is a side view of a connector assembly in accordance with embodiments of the present invention.
Figure 3:
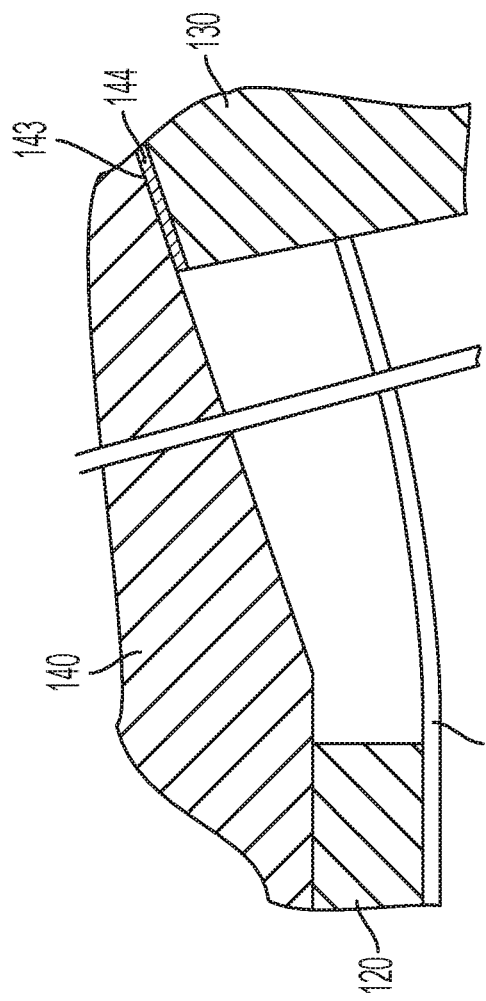
FIG. 3 is an enlarged side view of the encircled portion of the encircled portion of FIG. 2 in accordance with embodiments of the present invention.

With reference to FIGS. 1-3, an optical connector assembly 101 is provided and includes a printed circuit board (PCB) or substrate 110, an optical or photonic chip (hereinafter referred to as an "optical chip") 120 that can include waveguides or other similar features and is connectable with a fixed ferrule 130 via a waveguide 135, such as optical fibers, and which is operably disposed on a section 111 of the substrate 110, a structural feature 140 and a clip 150. The structural feature 140 includes a structural section 141 and a ferrule support section 142. The structural section 141 is disposed over the optical chip 120 and the section 111 of the substrate 110. The ferrule support section 142 extends from the structural section 141 to form a holding structure an angle α relative to the section 111 of the substrate 110. The ferrule support section 142 includes a surface 143. The fixed ferrule 130 is adhered to the surface 143. The surface 143 can be adhered to the fixed ferrule 130 by adhesive 144. The clip 150 extends longitudinally along the ferrule support section 142, the fixed ferrule 130 and the cable ferrule 160 at the angle α of the ferrule support section 142. The clip 150 is attachable to the ferrule support section 142 and is configured to mate with and secure a cable ferrule 160 to the fixed ferrule 130 for optical coupling of the cable ferrule 160 to the fixed ferrule 130 so as to provide for optical signal communication.

The ferrule support section 142 can be offset vertically relative to the optical chip 120 in order to create a bending of the waveguide 135.

The fixed ferrule 130 and the cable ferrule 160 form mating halves that are optically connectable to enable transmission of light signals from an optical cable 161 (see FIG. 2) to the optical fibers 135 and then to the optical chip 120. The fixed ferrule 130 and the cable ferrule 160 each include light guiding structures and can be provided as MT-type ferrules, LC-type ferrules, MU-type ferrules, SC-type ferrule, SN-type ferrule, and ST-type ferrules, or any other suitable ferrule types.

While the fixed ferrule 130 and the cable ferrule 160 are described herein and illustrated in the figures as MT-type ferrules, it is to be understood that this is done for purposes of clarity and brevity and should not be interpreted in a manner that otherwise limits the overall disclosure in any way.

The substrate 110 supports the optical chip 120. A V-groove array or other interface positioned on an underside of the optical chip 120 mates in a light transmitting manner to the waveguide 135, which can be provided as an optical fiber array ribbon or a polymer waveguide array defined on a polymer ribbon. The waveguide 135 extends from the optical chip 120 to within the fixed ferrule 130. The optical chip 120, the waveguide 135 and the fixed ferrule 130 can be assembled together during manufacturing processing using a pick-and-place tool. The optical chip 120 can be electrically connected to the section 111 of the substrate 110 by a substrate layer 121 and a connection layer 122, such as a land grid array (LGA), a ball grid array (BGA), etc.

As shown in FIGS. 1 and 2, the substrate 110 can have a substantially larger footprint than the section 111 of the substrate 110 and the optical connector assembly 101. As such, multiple optical connector assemblies 101 can be attached to the substrate 110 at, for example, the periphery 112 thereof. Of each of these multiple optical connector assemblies 101, one or more optical chips 120 can be connected with corresponding fixed ferrules 130, each of the structural features 140 can have multiple (e.g., one or more or two or more) ferrule support sections 142 extending outwardly from a structural section 141 and each of the clips 150 can be attachable to a corresponding ferrule support section 142 and be configured to secure a cable ferrule 160 for optical communication with the corresponding fixed ferrule 130.

It is to be understood that, while the drawings illustrate structural feature 140 from which the ferrule support section 142 extends to fix the fixed ferrule 130, other structural elements can be used. These include, but are not limited to, a stiffener or protruding feature that are attached, latched or soldered to the substrate 110.

Notably, for the multiple optical connector assemblies 101 of FIG. 1, a density of the multiple optical connector assemblies 101 is substantially greater than what would have been possible in conventional assemblies. This is due, in part, to the fact that respective widths of each of the clips 150 are only slightly wider than the respective widths of each of the corresponding fixed ferrules 130 and each of the corresponding cable ferrules 160. This will be described in further detail below.

With continued reference to FIGS. 2 and 3, the angle α at which the ferrule support section 142 extends from the structural section 141 relative to the section 111 of the substrate 110 can be a non-zero angle. In accordance with embodiments of the present invention, the angle α can be between about 3° and 7° or, more particularly, between about 3.2° and 6.7° (of course, other angles are possible). In any case, as shown in FIGS. 2 and 3, a controlled bending of the waveguide 135 can be provided in order to accommodate CTE mismatches with bending changes. This effect can be adjusted as well with the vertical offset of the ferrule support section 142 and assembly processes.

In accordance with further embodiments of the present invention, the adhesive 144 by which the fixed ferrule 130 is adhered to the surface 143 of the ferrule support section 142 can include a glue or epoxy which is heat cured. In these or other cases, the heat curing of the adhesive 144 can serve to induce a further bend of the waveguide 135, as the thermal dilatation of the ferrule support section 142 location will increase the bending once it is cooled. Such induced bending can be further accommodated by the bending of the waveguide 135, which effectively serves to compensate for the CTE mismatches between at least the optical chip 120, the structural feature 140 and the fixed ferrule 130.

As shown in FIG. 2, in particular, the angle α is sufficient to remove the fixed ferrule 130 from the plane of the section 111 of the substrate 110 or of the substrate 110 as a whole. As a result, interference (e.g., mechanical interference) between the fixed ferrule 130 and the substrate 110 is prevented.

In addition, the angling of the ferrule support section 142 can also have the benefit of easing access of the optical face mating of the fixed ferrule 130 for cleaning and inspection.

Figure 5:
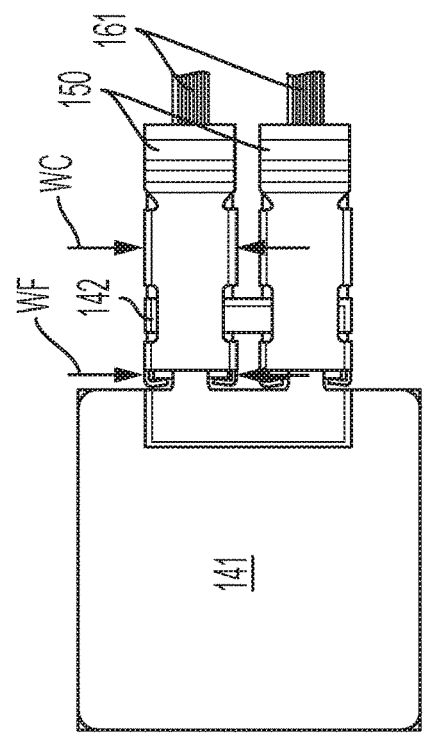
FIG. 5 is a top down view of the connector assembly with the multiple clips of FIG. 4 in accordance with embodiments of the present invention.
Figure 6:
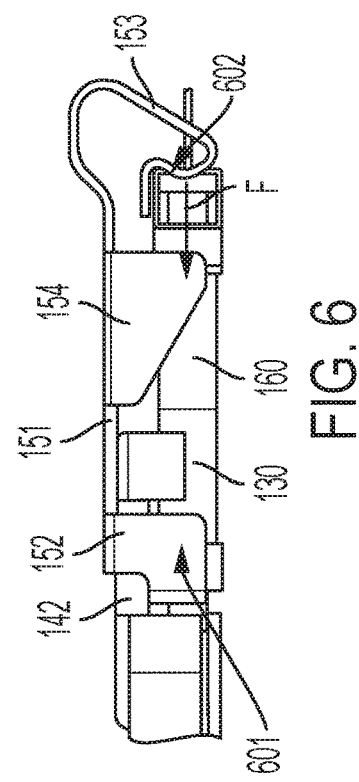
FIG. 6 is a side view of a connector assembly with a clip in accordance with embodiments of the present invention'

With reference to FIGS. 4-7, the clip 150 includes a spine 151, a hook element 152 that is integrally coupled with a forward end of the spine 151 and configured to hook onto an underside of the ferrule support section 142 and a spring-like elastic element 153. The elastic element 153 is integrally coupled with an aft end of the spine 151 and is configured to elastically bias the cable ferrule 160 toward the fixed ferrule 130 so as to bias the fixed and cable ferrules 130 and 160 toward each other to create a mating force that allows for reliable optical light coupling. The clip 150 can further include guiding features 154 that extend from opposite sides of the spine 151 between the forward and aft ends to facilitate insertion of the clip 150. In accordance with embodiments of the present invention, the hook element 152 can have a reverse L-shape 601 as shown in FIG. 6 and the elastic element 153 can have an S-shape 602 as shown in FIG. 6.

Figure 4:
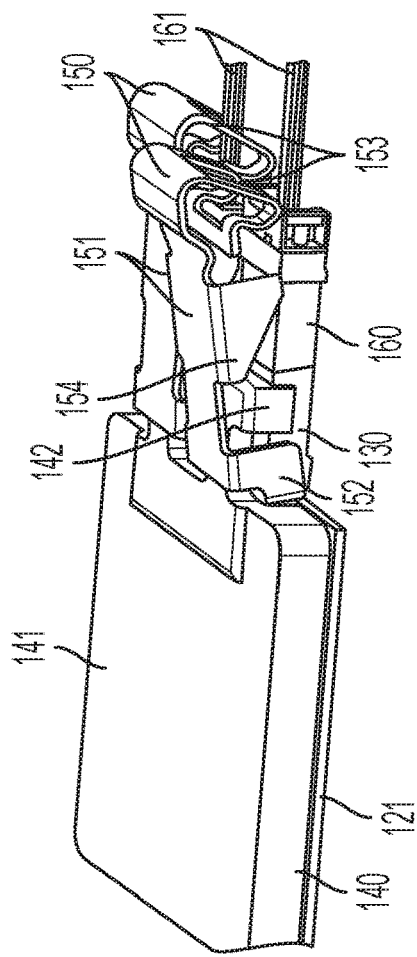
FIG. 4 is a perspective view of a connector assembly with multiple clips in various stages of assembly in accordance with embodiments of the present invention.

As shown in FIGS. 4 and 5, in particular, a maximum width WC of the clip 150 is only slightly larger than a maximum width WF of the fixed ferrule 130 and the cable ferrule 160. As such, a density of the optical connector assemblies 101, which in this case is defined as the number of sub-assemblies that can be clustered onto a section 111 of the substrate 110 (i.e., three in the embodiments of FIG. 1 and two in the embodiments of FIGS. 4-7, is increased.

Figure 7:
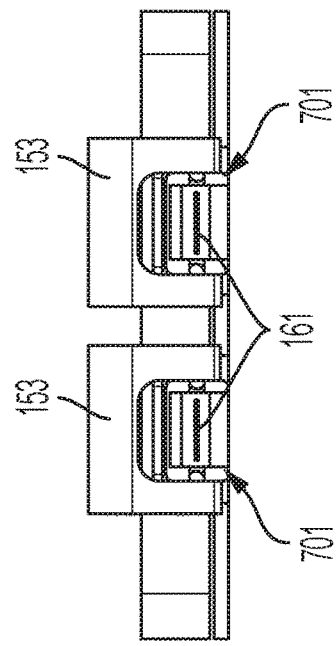
FIG. 7 is a rear view of a connector assembly with multiple clips in accordance with embodiments of the present invention.

As shown in FIG. 7, in particular, the elastic element 153 can be formed to define an opening 701 that is large enough to accommodate the optical cable 161. Even still, the clip 150 uses a back shoulder of the cable ferrule 160 to engage the spring load through the spine 151, the hook element 152 and the elastic element 153.

An assembly of the clip 150 onto the ferrule support section 142 is partially illustrated in FIG. 4. As shown in FIG. 4, once the cable ferrule 160 is brought into an optical mating condition with the fixed ferrule 130 to initiate light coupling, the assembly initially involves the angling of the hook element 152 underneath the underside of the ferrule support section 142 and a subsequent pivoting of the spine 151 downward onto the proximal upper surface of the ferrule support section 142. During this pivoting, the guiding features 154 slide along opposite sides of the fixed and cable ferrules 130 and 160 and thereby guide the clip 150 over the fixed and cable ferrules 130 and 160. When the pivoting is nearly completed, the elastic element 153 applies to the cable ferrule 160 a compressive force F, which is generally directed along the arrow shown in FIG. 6 and which is generally defined along the aligned longitudinal axes of the cable ferrule 160 and the fixed ferrule 130 to secure and enhance the optical light coupling between the fixed and cable ferrules 130 and 160, also commonly called ferrule mating. Upon complete assembly of the clip 150, the clip 150 is aligned with the longitudinal axis of the fixed ferrule 130 and the cable ferrule 160.

Figure 8:
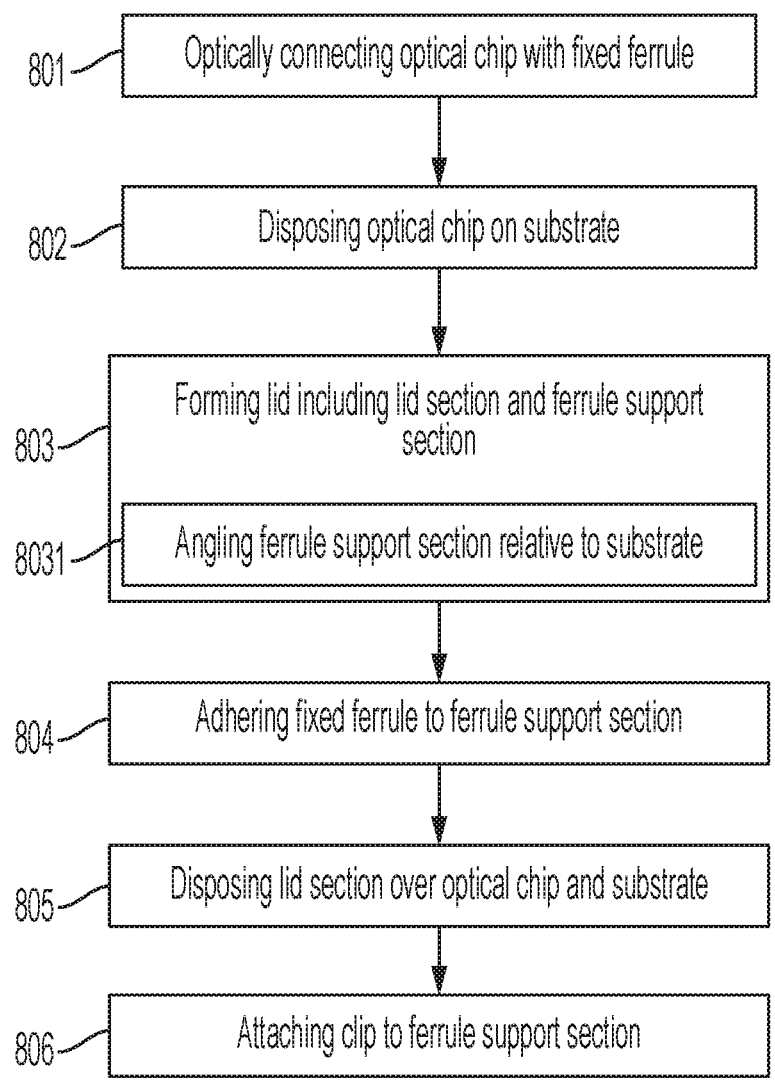
FIG. 8 is a flow diagram illustrating a method of assembling a connector assembly in accordance with embodiments of the present invention.

With reference to FIG. 8, an example method of assembling the optical connector assembly 101 as described above is provided. As shown in FIG. 8, the method includes optically connecting an optical chip with a fixed ferrule (801) and disposing or joining the optical chip on a substrate (802). The method further includes forming a structural feature that includes a structural section and a ferrule support section (803), adhering the fixed ferrule to the ferrule support section (804) and disposing the structural feature 140 over the optical chip and the substrate (805).

It is to be understood that other orders of the method can be applied to create the optical connector assembly. As examples, the optical chip being joined to the substrate prior the optical connector can be imaged or the fixed ferrule can be joined to the structural element before being added a device, etc.

The forming of the structural feature 140 of operation 803 can include forming the ferrule support section such that, with the structural feature disposed over the substrate and possibly over the optical chip, the ferrule support section extends from the structural section 141 at an angle relative to the substrate (8031). In addition, the method also includes attaching a clip to the ferrule support section (806). As described above, the clip is configured to secure a cable ferrule for optical communication with the fixed ferrule and a maximum width of the clip is slightly larger than a maximum width of the fixed and cable ferrules.

The optical connector assembly eases testing of the module compare to pigtails, since the optical connector assembly is at a fixed location with regards the optical module package. It also eases manufacturing and enables the usage of surface mount technologies since there are no dangling pigtails to handle.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered as part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A structural feature of an optical connector assembly in which an optical chip is connectable with a fixed ferrule via a waveguide and is joined onto a section of a substrate, the structural feature comprising:
   a structural section disposed on one of the optical chip and the substrate; and
   a ferrule support section that extends from the structural section and comprises a surface for adhesion to the fixed ferrule,
   wherein a bending of the waveguide accommodates an angle of the ferrule support section relative to the section of the substrate.

2. The structural feature according to claim 1, further comprising adhesive between the surface of the ferrule support section and the fixed ferrule, wherein the adhesive is heat cured to enhance bending control of the waveguide toward the fixed ferrule.

3. The structural feature according to claim 1, further comprising a cover plate adhered to the substrate to cover the optical chip.

4. The structural feature according to claim 1, wherein two or more ferrule support sections extend from the structural section and respectively comprise the surface for adhesion to the fixed ferrule.

5. The structural feature of the optical connector assembly according to claim 1, further comprising a clip attachable to the ferrule support section and configured to mate with and secure a cable ferrule with the fixed ferrule for light coupling between the cable ferrule and the fixed ferrule.

6. An optical connector assembly, comprising:
   a substrate;
   an optical chip connectable with a fixed ferrule via a waveguide and disposed on the substrate;
   a structural feature comprising a structural section disposed over one of the optical chip and the substrate and a ferrule support section extendable from the structural section and comprising a surface for adhesion to the fixed ferrule; and
   a clip attachable to the ferrule support section and configured to mate with and secure a cable ferrule with the fixed ferrule for light coupling between the cable ferrule and the fixed ferrule,
   wherein a bending of the waveguide accommodates an angle of the ferrule support section relative to the substrate.

7. The optical connector assembly according to claim 6, further comprising adhesive between the surface of the ferrule support section and the fixed ferrule, wherein the adhesive is heat cured in a manner to enhance bending control of the waveguide toward the fixed ferrule.

8. The optical connector assembly according to claim 6, wherein the structural feature comprises two or more ferrule support sections extendable from the structural section at respective angles relative to the substrate and respectively comprising the surface for adhesion to the fixed ferrule.

9. The optical connector assembly according to claim 6, wherein a maximum width of the clip is slightly larger than a maximum width of the fixed ferrule.

10. The optical connector assembly according to claim 6, wherein the clip extends along an angle of the ferrule support section relative to the substrate.

11. The optical connector assembly according to claim 6, wherein the clip comprises:
   a spine;
   a hook element integrally coupled with a forward end of the spine to hook onto an underside of the ferrule support section; and
   an elastic element integrally coupled with an aft end of the spine to elastically bias the cable ferrule toward the fixed ferrule.

12. The optical connector assembly according to claim 11, wherein the elastic element defines an opening to accommodate an optical cable.

13. A clip for securing a cable ferrule to a fixed ferrule for light coupling with the fixed ferrule adhered to a ferrule support section, the clip comprising:
   a spine;
   a hook element integrally coupled with a forward end of the spine to hook onto an underside of the ferrule support section;
   an elastic element integrally coupled with an aft end of the spine to elastically bias the cable ferrule toward the fixed ferrule,
   wherein a bending of a waveguide by which the fixed ferrule is connected to an optical chip accommodates an angle of the ferrule support section relative to a substrate on which the optical chip is disposed.

14. The clip according to claim 13, wherein a maximum width of the clip is slightly larger than a maximum width of the fixed ferrule.

15. The clip according to claim 13, wherein the elastic element defines an opening to accommodate an optical cable.

16. The clip according to claim 13, wherein the hook element is reverse L-shaped.

17. The clip according to claim 13, wherein the elastic element is S-shaped.

18. The clip according to claim 13, further comprising guiding features extending from opposite sides of the spine.

* * * * *